F. J. BALDER, F. J. LAWSON & A. C. DAVIS.
VARNISHING MACHINE.
APPLICATION FILED AUG. 28, 1911.

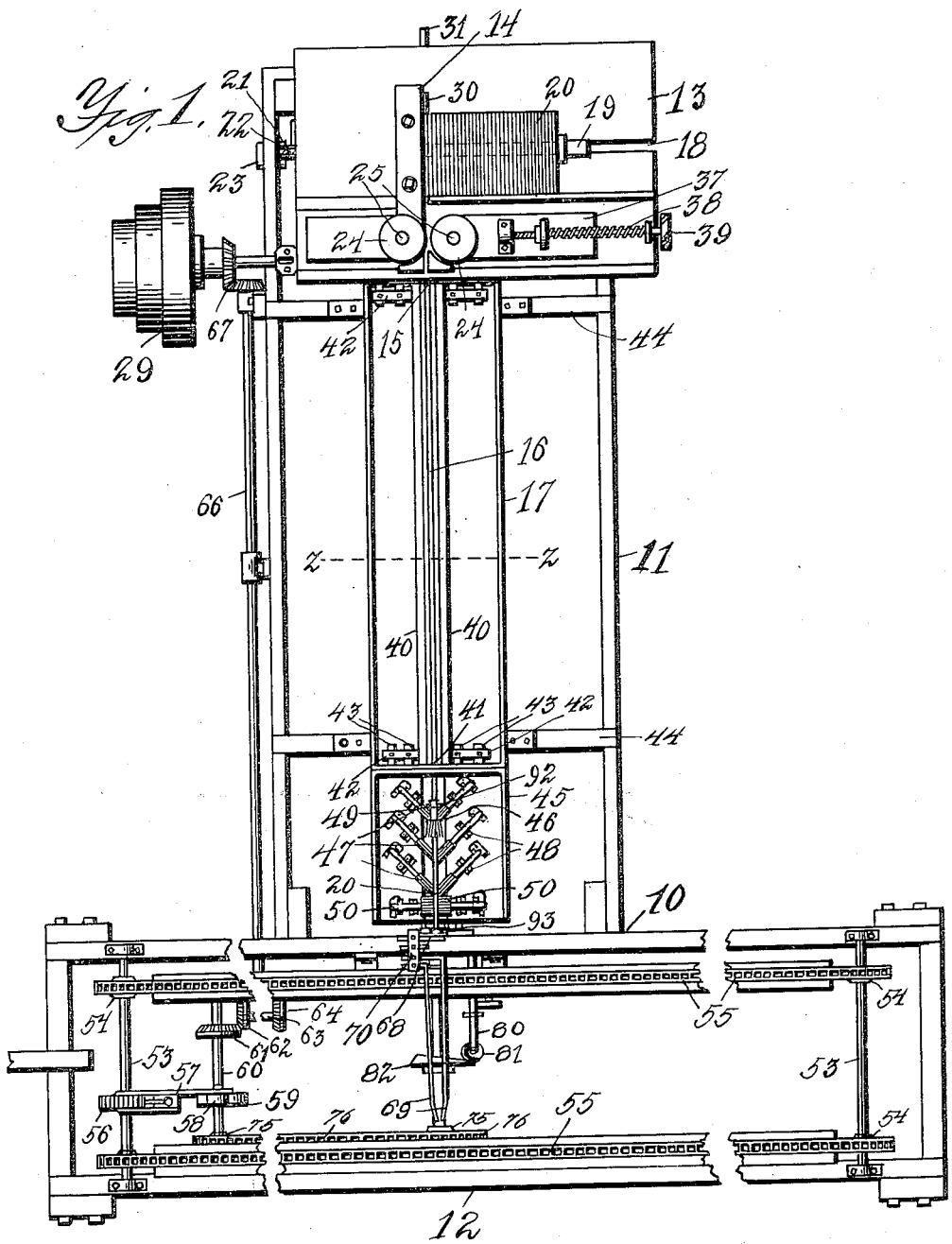

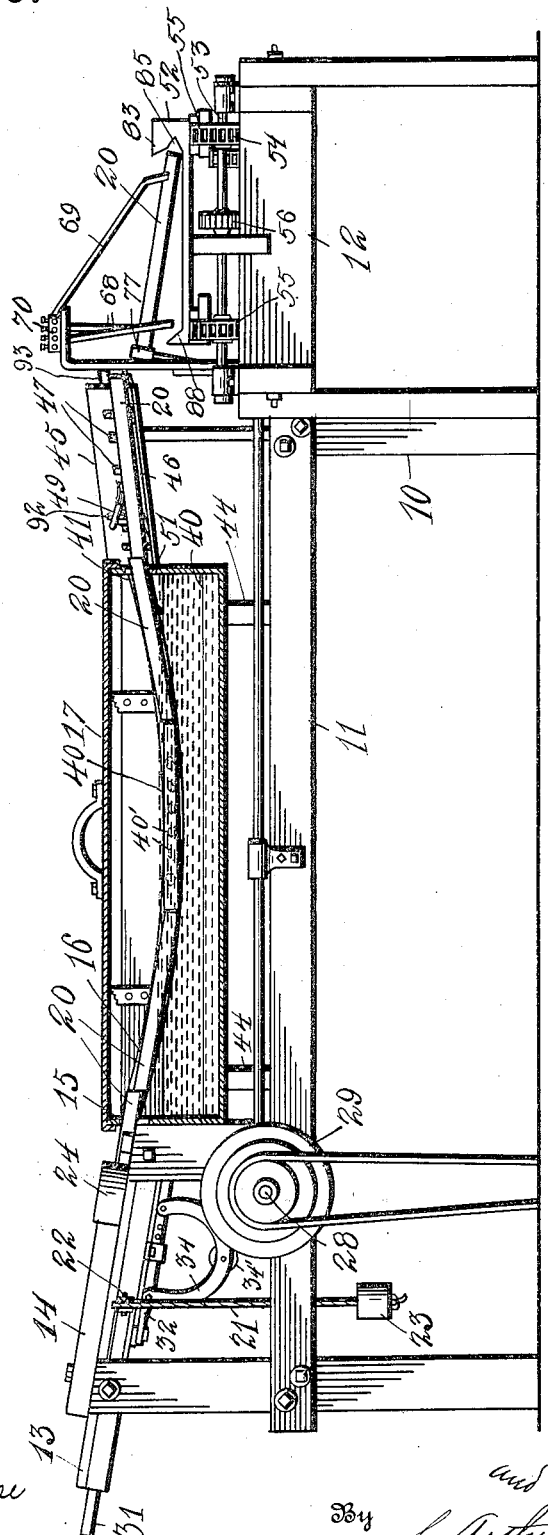

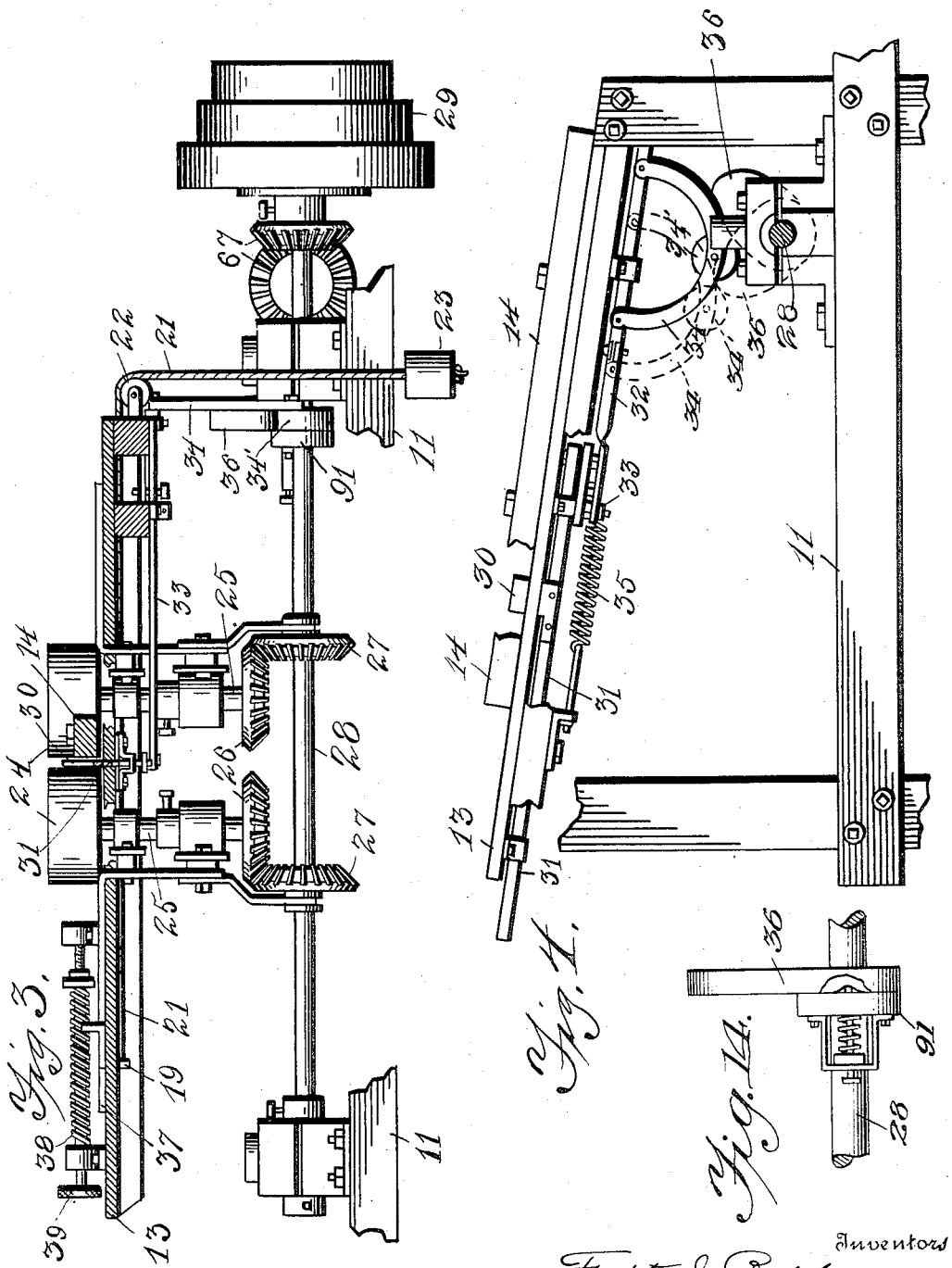

1,036,419.

Patented Aug. 20, 1912.
6 SHEETS—SHEET 4.

Witnesses
Arthur O. Morse
H. U. Harris

Inventors
Fritz J. Balder
Frank J. Lawson
Alfred C. Davis
By S. Arthur Baldwin.
Attorney F. J. BALDER, F. J. LAWSON & A. C. DAVIS.
VARNISHING MACHINE.
APPLICATION FILED AUG. 28, 1911.
1,036,419.
Patented Aug. 20, 1912.
6 SHEETS—SHEET 5.
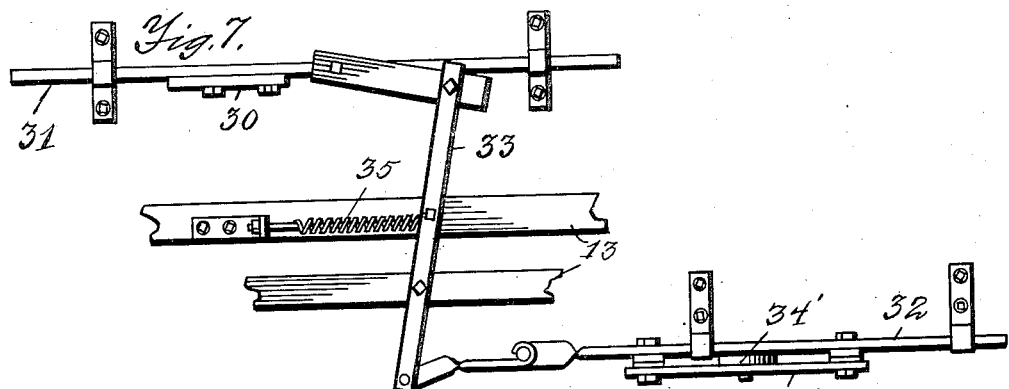
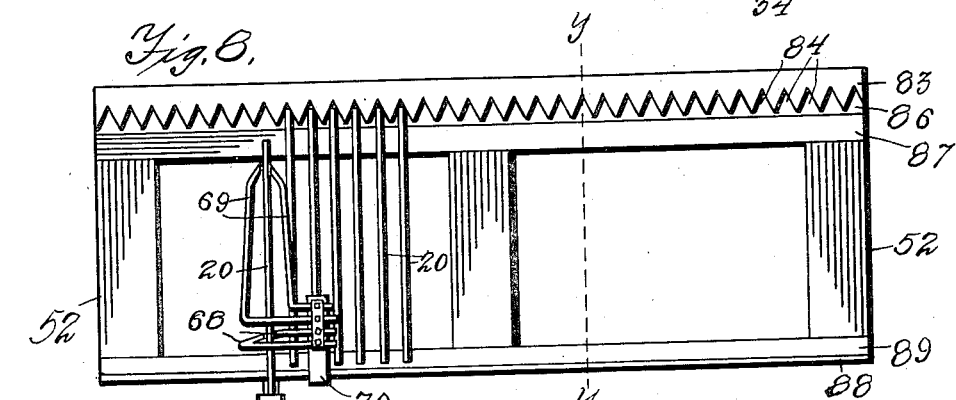
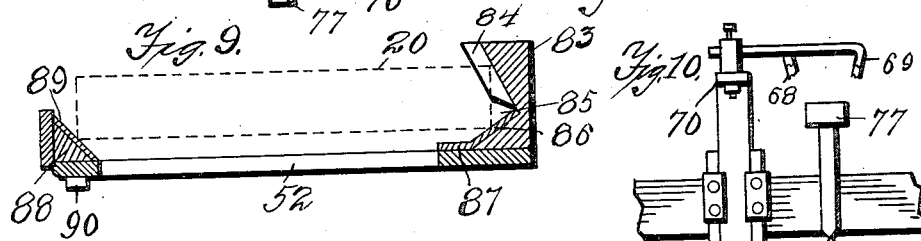
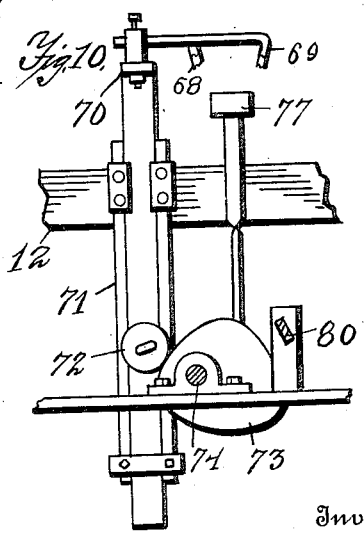
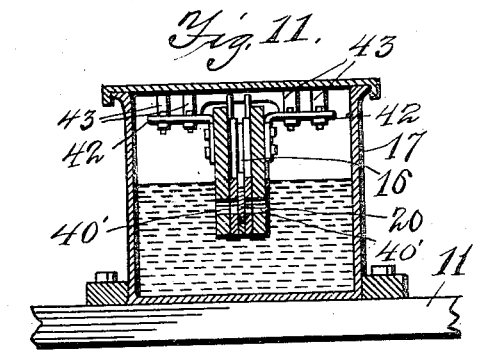
Witnesses
Arthur O. Morse
H. U. Harris
Inventors
Fritz J. Balder,
Frank J. Lawson,
and Alfred C. Davis,
By S. Arthur Baldwin.
Attorney F. J. BALDER, F. J. LAWSON & A. C. DAVIS.
VARNISHING MACHINE.
APPLICATION FILED AUG. 28, 1911.
1,036,419.
Patented Aug. 20, 1912.
6 SHEETS—SHEET 6.
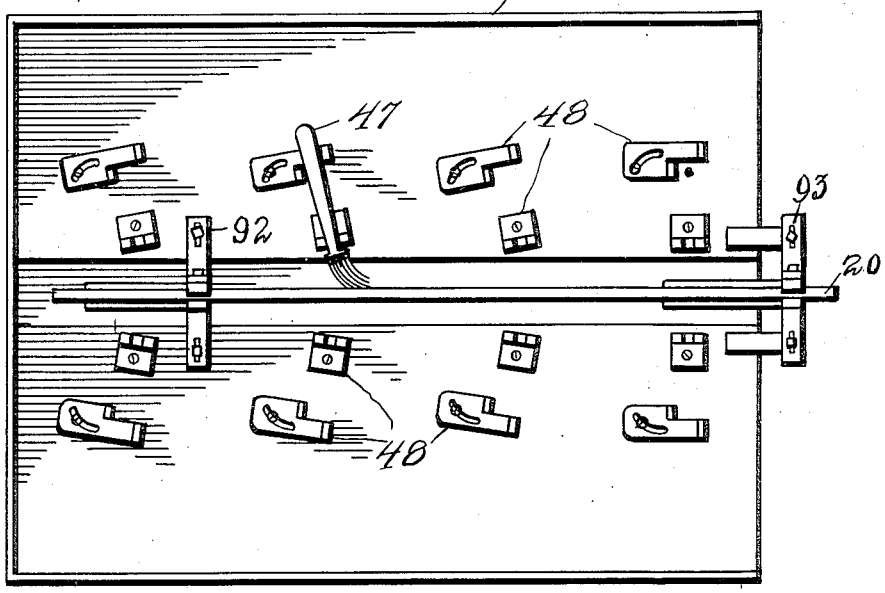
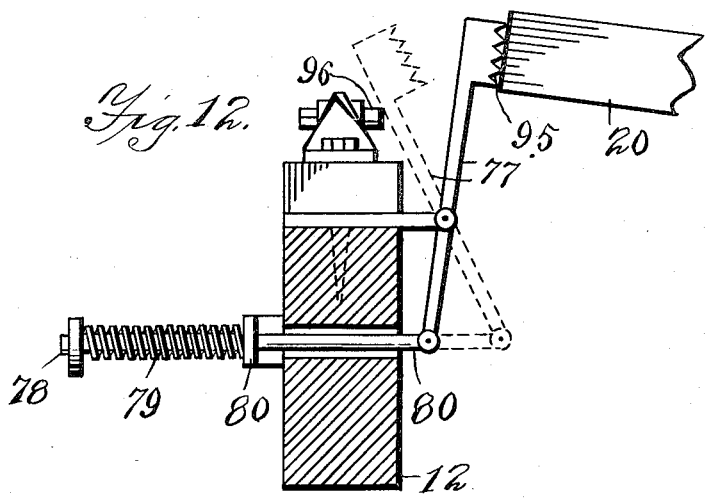

UNITED STATES PATENT OFFICE.

FRITZ J. BALDER, FRANK J. LAWSON, AND ALFRED C. DAVIS, OF FALCONER, NEW YORK, ASSIGNORS TO AMERICAN MANUFACTURING CONCERN, OF FALCONER, NEW YORK, A CORPORATION OF NEW YORK.

VARNISHING-MACHINE.

1,036,419. Specification of Letters Patent. Patented Aug. 20, 1912.

Application filed August 28, 1911. Serial No. 646,449.

*To all whom it may concern:*

Be it known that we, FRITZ J. BALDER, FRANK J. LAWSON, and ALFRED C. DAVIS, citizens of the United States, and residents of Falconer, in the county of Chautauqua and State of New York, have invented new and useful Improvements in Varnishing-Machines, of which the following, taken in connection with the accompanying drawings, is a specification.

The invention relates to varnishing machines for rulers, strips and articles which may be fed through a groove; and the objects of our invention are to provide a simple and convenient machine for dipping and brushing the articles to be varnished, wherein said articles may be automatically fed and varnished and deposited in drying racks separate from one another, it only being required to place the articles on the automatic feeder and provide the empty racks, removing the full racks; and the invention consists in the combination and arrangement of the parts as shown in this specification and the accompanying drawings and pointed out in the claims.

Figure 5:
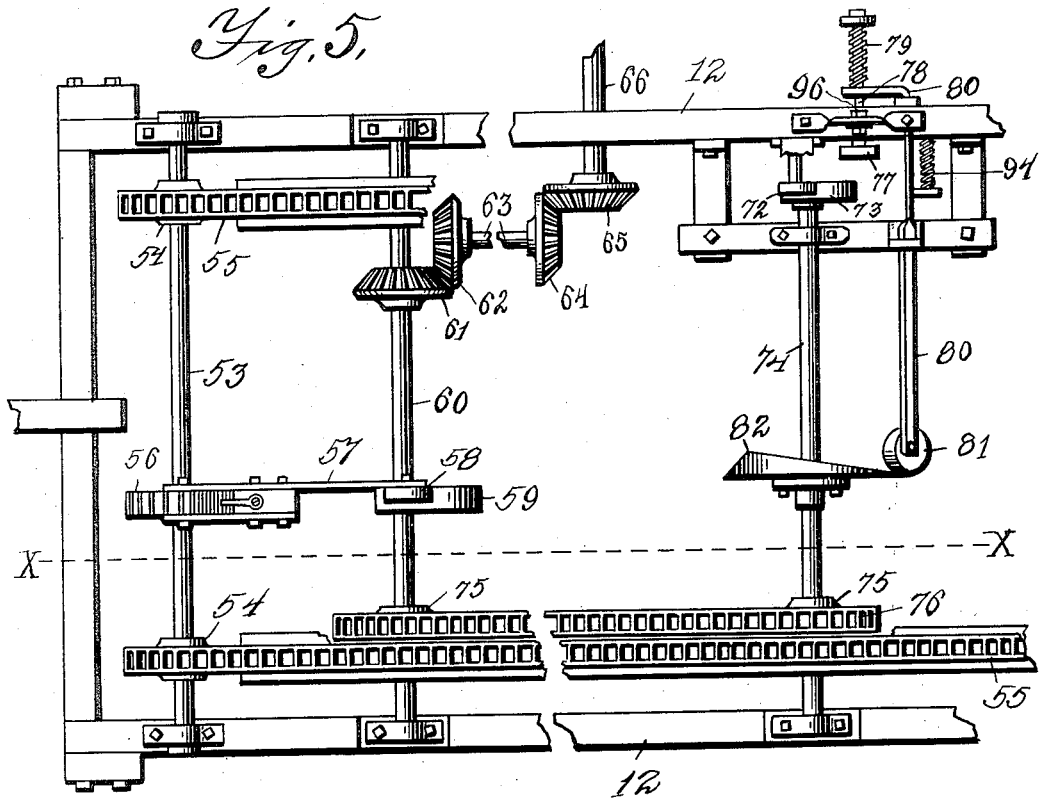
Figure 6:
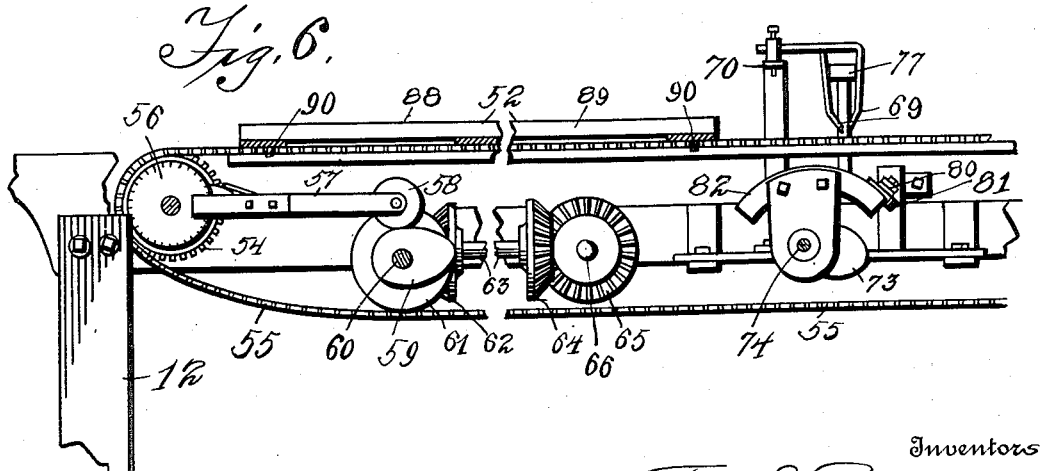

In the drawings, Figure 1 is a plan view of the machine without the drying racks, showing the rulers or other articles in the process of being fed through the dipping tank and brushes. Fig. 2 is a side elevation of the machine with the dipping tank and brush pan in lengthwise section, showing the path of the rulers as they pass through the same, one of the rulers being shown in the act of dropping upon the drying rack and guided to an individual notch thereon. Fig. 3 is an elevation of the feed operating mechanism for the rulers, the feed table being shown in section; and Fig. 4 is a side elevation of the feed table and operating mechanism, the driving pulley being removed. Fig. 5 is a plan view of the mechanism for guiding the varnished rulers into place in the drying racks and for moving the racks step by step after placing said rulers in said racks. Fig. 6 is a sectional view at line X X in Fig. 4 showing an elevation of the cam and sprocket wheel and chain for the drying racks, showing one of the drying racks in position thereon. Fig. 7 is a detail of a portion of the ruler feeding mechanism. Fig. 8 is a plan view of one of the drying racks, showing the varnished rulers in position and the guiding mechanism guiding one of the rulers into position thereon; and Fig. 9 is a sectional view at line Y Y in Fig. 8. Fig. 10 is an elevation of the cam for reciprocally raising and lowering the guiding mechanism for the rulers. Fig. 11 is a crosswise sectional view of the varnish tank at line Z Z in Fig. 1. Fig. 12 is an elevation of the reciprocating guide finger. Fig. 13 is a plan view of the brush pan. Fig. 14 is a side elevation of a spring pin clutch and cam which actuates the feeding mechanism.

Like numerals of reference refer to corresponding parts in the several views.

The numeral 10 designates the frame of the machine which is of sufficient height for the operators to easily handle thereon the rulers or other articles to be varnished in feeding them and taking the loaded drying racks from the machine. The frame 10 is T-shaped, being composed of the part 11 upon which the feeding mechanism, dipping tank and brush pan are supported, and a part 12 which is placed crosswise at one end of the part 11 to support thereon the drying racks and the sprocket chain mechanism for giving to said drying racks an intermittent or step by step movement to receive the varnished rulers one by one during each pause in the step by step advancement of the drying racks.

The feeding mechanism consists of the inclined feeding board 13 which has a guide block 14 attached thereto opposite the mouth 15 of the groove 16 in the dipping tank 17. The feed board 13 is inclined toward the mouth 15 and has therein the slot 18 to receive the slidably mounted presser block 19, which slot 18 extends to the guide block 14, and the rulers 20 to be varnished are held between the presser block 19 and the guide block 14. The presser block 19 has a cord 21 attached thereto which passes over a pulley 22 on the underside of feed board 13 and supports a weight 23 to hold the presser block 19 against the rulers 20 and draw the rulers toward block 14, the presser block 19 and rulers 20 advancing gradually toward the guide 14 as said rulers are fed out one by one. In feeding the rulers a number of them are placed side by side edgewise upon feed board 13, as shown in Fig. 1, and the ruler nearest the guide block 14 is fed into the machine in the following manner: A pair of feed wheels 24 are mounted between the mouth 15 of groove 16 and block 14. The feed wheels 24 are of the same circumference as the length of the ruler or the article to be fed into the machine. For different lengths of rulers accordingly different sized wheels 24 must be provided. The feed wheels 24 are mounted on vertical shafts 25 which have suitable journals on the under side of the feed board 13. The shafts 25 support on their lower ends the bevel gears 26 which mesh in bevel gears 27. The bevel gears 27 are mounted on shaft 28, which shaft is revolubly mounted in suitable journals on frame 10 and has a driving pulley 29 thereon. One of the feed wheels 24 is rotatively mounted on a plate 37, which plate is adjustably mounted upon feed board 13 and a tension is given to the wheel 24 by means of a spring 38 and screw 39, which are mounted in suitable lugs upon the plate 37 and feed board 13. This tension always insures a pressure of the wheels 24 upon the ruler 20. It will thus be seen that different thicknesses of rulers may be passed between the feed wheels 24 and will be fed by the frictional contact of the wheels upon the ruler. In order to feed the rulers 20 between the two wheels 24, a finger 30 is extended up through feed board 13 in a slot adjacent guide 14, which finger 30 engages one ruler at a time. The finger 30 is attached to a rod 31 which is slidably mounted on the underside of feed board 13. The rod is connected with a second and parallel rod 32 by toggle link connection 33, the crosswise link being pivotally attached to feed board 13 and has the spring 35 attached thereto to return rod 31 to normal position, ready to feed down another ruler. The rod 32 has a projecting strip 34 attached thereto upon which a roller 34' is revolubly mounted. A cam 36 is mounted on shaft 28 and the rotation of shaft 28 turns cam 36 thereby giving a reciprocative movement to rods 31 and 32 by means of their link connection, thereby giving to finger 30 its required reciprocative feeding movement.

The varnish tank 17 is provided with two lengthwise guide pieces 40 which form the grooves 16 therebetween. The groove 16 is formed on a gradual downward and upward curve from the inlet mouth 15 to the exit port 41. At the lowest portion of the guide groove 16 a plurality of holes 40' are provided through each of the lengthwise pieces 40 to admit the varnish to this lower portion of the groove 16 through which the rulers pass. The pieces 40 which form the groove 16 therebetween are fitted to one another so as to adjust the width of the groove 16 so that rulers of different thicknesses may be passed therebetween. For this purpose each of the guide pieces 40 is attached to a bracket piece 42 at each end and the bracket pieces 42 are adjustably mounted on bracket pieces 43, which bracket pieces 43 are attached to the ends of the tank 17. It is now apparent that the width of the groove 16 may be adjusted as desired. The tank 17 is filled with varnish above the hole 40' and is supported upon cross bars 44 on frame 10.

The tank 17 supports at its outlet end the brush pan 45. The brush pan 45 is provided with a central lengthwise channel 46 into which the varnish drips as it is wiped from the dripping rulers by a series of brushes 47. The brushes 47 are arranged in pairs, one brush to each side of the ruler, and the handles are held by adjustable clasps or holding clips 48 attached to the bottom of the pan 45. The brushes are placed obliquely from the path of the rulers so that the rulers, which always travel in the same direction, will pass freely between the brushes. A sufficient number of pairs of the brushes are provided and the brushes are graded from coarse to fine so that as the rulers emerge from the last pair of brushes the varnish will be brushed smooth on all sides of the same. A single brush 49 is provided to brush the upper edge of the ruler and a pair of brushes 50 are provided to brush the under edge of the ruler which may be beveled or rounded or square as desired. A connective tube 51 is provided from channel 46 in pan 45 back into the tank 17 so that the varnish drips back into the tank from the channel 46 in pan 45.

The drying mechanism for the rulers consists of the drying racks 52 and the sprocket mechanism for advancing said drying racks with a step by step movement. The sprocket mechanism is supported upon frame part 12 and consists of the cross shafts 53 journaled on frame part 12 near each end. The shafts 53 bear the sprocket wheels 54 at each side of the frame part 12 to receive the endless sprocket chains 55. The sprocket wheels 54 and chains 55 are given a step by step movement by means of a ratchet wheel 56 on one of the shafts 53, and a ratchet bar 57 with roller 58 thereon, which roller bears against the cam 59 on shaft 60. The shaft 60 also bears a bevel gear 61, which gear meshes in bevel gear 62, which gear is mounted upon a short shaft 63, which shaft bears on its opposite end the bevel gear 64, which gear in turn meshes in a bevel gear 65 on the end of a shaft 66, which shaft extends to driving shaft 28 and is connected to said driving shaft by means of bevel gears 67. It is apparent that through this series of shafts and gears and cam 59 the ratchet wheel 56 will be turned a step at a time.

In order to guide the rulers 20 into the drying racks 52, two pairs of guide wires 68 and 69 are provided, a guide for each side near each end of the ruler, as shown in Figs. 1, 6 and 8. The guides 68 and 69 are so formed that the ruler passes out between said guides as it is fed through the machine and then drops down between the points of the guides. The guides 68 and 69 are given a reciprocating upward and downward movement by means of a standard 70 which is slidably mounted in a vertical holder 71 on frame part 12. A roller 72 is mounted on a wrist on standard 70, which roller bears against a cam 73 on a cross shaft 74 which is revolubly journaled upon frame part 12. The shaft 74 is revolved by means of sprocket wheels 75 and chain 76 which connect shaft 74 with shaft 60, the rotation of which we have hereinbefore described. As the guides 68 and 69 pass downward with the varnished ruler therebetween, the ruler is dropped upon the rack, then said guides are immediately raised to receive the next ruler.

The rulers pass through the dipping tank and brush pan standing upon edge and are dropped edgewise between the four guides 68 and 69 upon the drying rack 52. It is apparent that they will rebound and not be guided into a separate supported position upon the rack without further control. For this purpose a finger 77 is provided on frame part 12 immediately beneath the exit port from pan 45. The finger 77 is hinged at its lower end to a rod 78 which bears a spring 79 thereon. The finger 77 is given a reciprocating movement by means of a bar 80 slidably mounted on frame part 12, which bar 80 bears a roller 81 which bears against the sectional cam 82 on shaft 74 and a spring 94 which bears against the frame. The opposite end of bar 80 from that on which roller 81 is revolubly mounted bears against spring 79 on rod 78. As shaft 74 is rotated the bar 80 is given a reciprocating movement with each rotation of the shaft 74, which reciprocating movement is timed to the delivery of each ruler from the varnishing pan 45, so that as said bar 80 moves the finger 77 backward and forward it catches the end of the ruler and pushes it into its vertical position upon the drying rack 52.

The drying racks 52 are arranged to hold the varnished rulers 20 in the vertical position and separate from one another so that they may dry without the surface of the ruler touching the rack any more than is positively necessary to support the ruler thereon. To accomplish this purpose the racks are provided with a notched overhanging side 83. The spaced notches 84 slant inward toward the lower edge of the side 83 and are cut away at 85, a sheet metal inclined surface 86 being provided for the lower corner of the end of the ruler 20, as shown in Fig. 9. It is apparent that when the ruler is pushed into position by the finger 77 upon the rack 52 within the notch 84, the upper corner touches within the overhanging notched side and the lower corner rests upon the incline 86, so that only the corners will be touched by the side 83. The sheet metal incline 86 is continued in the flat portion 87 to be sure of catching the end of the ruler 20 and it is then pushed up the incline 86 from the flat surface 87. The opposite rail 88 of the rack 82 is given an opposite incline 89 to receive the lower corner of the ruler 20. A projecting block 90 is provided on the lower side of one of the rails of the frame 52, which block engages in one of the links of the sprocket chain 55 so that the drying rack 52 will be carried by said sprocket chains and yet may be easily removed therefrom when the rack is full of varnished rulers supported in the separate vertical position.

In operating the machine the rulers 20 are placed in quantity edgewise upon the feeding board 13 and held thereon against the guide block 74 by the press block or weighted follower 19. The rulers are fed into the machine by means of the finger 30 in the manner hereinbefore described, said finger 30 pushing a ruler at a time between the friction wheels 24 which press the ruler into the groove 16 between the parts 40 within the varnish dipping tank 17. The rulers abut one upon another and push one another through the machine, thereby progressing through the groove 16, as shown in Fig. 2, and between the pairs of brushes in brush pan 45 and out between the vertically reciprocating guides 68 and 69. As the ruler falls between said guides its end is caught by the reciprocating finger 77 and it is pushed into its notch 84 on the drying rack 52. When the drying rack is filled the operator removes the filled rack from the machine. Should the rulers clog in any way upon the drying rack when engaged by the finger 77, the spring 79 permits the bar 80 to spring into place without fracture of the parts or marring the ruler.

The pear shaped cam 36 which actuates the feeding finger 30 for feeding the rulers 20 between the frictional wheels 24 is provided with a spring pin clutch 91 which is pressed against the side of the cam 36, holding it to its work in a shallow hole until finger 30 is clogged by a non-movable or crosswise ruler, in which case the spring pin clutch 91 slips upon the surface of the cam 36, thereby relieving the feeding mechanism until the obstruction can be removed. The feed wheels 24 are geared to revolve more swiftly than the feeding finger 30 moves, so that as soon as the ruler or other article which is being fed into the feed wheels, touches the wheels, they instantly snatch it away from the feed finger 30 so that there is never any danger of breaking or marring the rulers as they are being fed in. As hereinbefore stated the space between the feed wheels is adjusted to the thickness of the article to be varnished, also the guide groove 16 between the guide pieces 40 in the tank 17 must be adjusted to the thickness of the articles so that they will not pass one another or wedge in the guide groove 16, but will continually push one another through said groove and the machine.

The brush pan 45 contains two guides 92 and 93 for the rulers or articles to be varnished. The guides 92 and 93 are made adjustable to the articles so that they will pass freely through them, and yet said guides will hold the ruler or article firmly in line passing it out of the end guide 93 so its outer end drops squarely upon the surface 87 of the drying rack 52, thus also insuring that the ruler will be caught by the finger 77 and pushed into place upon the drying rack. The finger 77 is pivotally attached to the frame 12 midway of its length and is also pivotally attached at its lower end to the rod 78 as hereinbefore stated. The front face 95 of finger 77 is notched in order that the glue-coated end of the varnish dipped articles against which it presses may not stick to the face 95 but will freely drop therefrom. As finger 77 is reciprocally moved by means of bar 80 which presses against the stiff spring 79 it is apparent that its upper end 95 will be reciprocally moved, as shown in dotted line in Fig. 12. A stop 96 is provided for its rearward movement and cam 82 limits its forward movement. When actuated by cam 82 and bar 80 to press against the end of the ruler it is pressed back into normal position against stop 96 by means of spring 94 on bar 80, pressing between projection of bar 80 and the frame 12. The spring 79 is only barred against breakage of crosswise or jammed rulers as they are being placed in the drying rack. It is apparent that the stiff spring 79 will be pressed rather than break a ruler, otherwise it will cause the finger 77 to reciprocally push the rulers or other varnished articles into place upon the racks.

We claim as new:

1. A varnishing machine of the class described comprising a dipping tank, adjacent pieces supported in said tank to form a groove therebetween to fit the articles to be dipped, feeding mechanism to press the articles one by one through said groove and the liquid in said tank, and brushes at the opposite end of said groove to brush the articles as they emerge from said groove and dipping tank.

2. A varnishing machine of the class described comprising a frame, a dipping tank supported on said frame, pieces adjustably supported in said dipping tank to form a lengthwise adjustable groove therebetween to fit the articles to be dipped, said pieces having said groove therein on a curve lowest at its central portion, said pieces having holes therethrough to admit the varnish into said groove, said tank having ingress and egress openings therein opposite the ends of said groove, and means for pressing the articles to be varnished through said groove and tank and for brushing the same as they emerge from the tank.

3. A varnishing machine of the class described comprising a frame, a dipping tank on said frame, lengthwise guide pieces in said tank having a groove therebetween to receive the articles to be varnished, a feeding mechanism for said articles comprising feed wheels opposite the mouth of said groove, a guide and means for pressing the articles to be varnished against said guide, a finger along said guide, and means for giving said finger a reciprocating movement to feed said articles into said feed wheels one at a time.

4. A varnishing machine of the class described comprising a frame, a dipping tank on said frame, lengthwise guide pieces in said tank having a groove therebetween to receive the articles to be varnished, a feeding mechanism for said articles comprising feed wheels opposite the mouth of said groove, a guide and means for pressing the articles to be varnished against said guide, a finger along said guide, said finger attached to a slidably mounted guide bar, a shaft, means for turning said shaft, a cam on said shaft, bar and link mechanism operated by said cam to give said finger a reciprocating feeding movement for said articles to feed them between said feed wheels, and gears on said shaft to turn said feed wheels, substantially as described.

5. A varnishing machine of the class described comprising a frame, a dipping tank on said frame, guide pieces for the articles to be varnished adjustably supported in said dipping tank, a feed board on said frame opposite the end of said dipping tank, said feed board having a guide opposite the guides in said dipping tank, feed wheels on said frame and means for rotating the same, one of said feed wheels adjustably mounted and having a suitable spring tension to press against the articles to be varnished, a weight and presser block on said feed board and frame to press the articles to be varnished against said guide, a finger on said feed board along said guide, and means for reciprocally moving said finger to feed the articles to be varnished one by one into said feed wheels, substantially as and for the purpose specified.

6. A varnishing machine of the class described comprising a frame, a dipping tank on said frame, guide pieces adjustably supported in said tank to form a guide groove therebetween for the pieces to be varnished, feeding mechanism at one end of said tank to feed the articles to be varnished one by one into said guide groove, a brush pan attached to the opposite end of said tank from said feeding mechanism, and a plurality of brushes supported in said brush pan to brush all sides of the articles to be varnished as they are fed out of said guide groove and through said brush pan.

7. A varnishing machine of the class described comprising a frame, a dipping tank on said frame, guide pieces adjustably supported in said tank to form a guide groove therebetween for the pieces to be varnished, feeding mechanism at one end of said tank to feed the articles to be varnished one by one into said guide groove, a brush pan attached to the opposite end of said tank from said feeding mechanism, said brush pan having a channel therethrough for the varnish opposite the end of said guide groove and an opening into said tank for the varnish to drip back, and brushes supported in pairs on said brush pan on opposite sides of said channel to brush all sides of the articles to be varnished, substantially as specified.

8. A varnishing machine of the class described comprising a frame, a dipping tank on said frame, said tank having a guide groove therethrough for the articles to be varnished, feeding mechanism at one end of said tank opposite the end of said guide groove to feed the articles to be varnished thereinto one by one, a brush pan on the opposite end of said tank from said feeding mechanism, pairs of brushes in clasps on said brush pan to brush all sides of the articles to be varnished, sprocket wheels and chains on said frame and mechanism for moving said chains with a step by step movement, drying racks for the articles to be varnished on said sprocket chains, and guides on said frame for the articles to be varnished to guide them onto said drying racks.

9. A varnishing machine of the class described comprising a frame, a dipping tank on said frame, said tank having a guide groove therethrough for the articles to be varnished, feeding mechanism at one end of said tank opposite the end of said guide groove to feed the articles to be varnished thereinto one by one, a brush pan on the opposite end of said tank from said feeding mechanism, pairs of brushes in clasps on said brush pan to brush all sides of the articles to be varnished, sprocket wheels and chains on said frame and mechanism for moving said chains with a step by step movement, drying racks for the articles to be varnished having a raised notched side to separately hold the articles to be varnished, and guiding mechanism for said articles to be varnished to guide them into said separate notches, substantially as specified.

10. A varnishing machine of the class described comprising a dipping tank, a brush pan, feeding mechanism for feeding the articles to be varnished therethrough, drying racks having spaced notches thereon for the articles to be varnished, mechanism for moving said drying racks a special distance equal to said spaced notches with a step by step movement, guides on said frame to guide said articles to be varnished onto said drying racks, and a reciprocating finger on said frame to move said articles into said spaced notches, substantially as and for the purpose specified.

11. A varnishing machine of the class described comprising a dipping tank, a brush pan and feeding mechanism for feeding the articles to be varnished therethrough, drying racks having spaced notches thereon for the articles to be varnished, mechanism for moving said drying racks a spaced distance equal to said spaced notches with a step by step movement, guides on said frame to guide said articles to be varnished onto said drying racks, a finger on said frame, and a cam on said frame connected to said finger to reciprocally move said finger to actuate said articles to be varnished into the spaced notches of said drying rack.

12. A varnishing machine of the class described comprising a dipping tank, a brushing pan and feeding mechanism for feeding the articles to be varnished therethrough, drying racks having spaced notches thereon for the articles to be varnished, mechanism for moving said drying racks a spaced distance equal to said spaced notches with a step by step movement, vertically movable guides on said frame to guide the articles to be varnished onto said drying rack, a reciprocally movable finger on said frame beneath said vertically movable guides, and a cam and bar mechanism to reciprocally move said finger to catch the end of the article to be varnished and move it into one of said spaced notches, substantially as and for the purpose specified.

In testimony whereof we have signed our names to this specification in the presence of two subscribing witnesses.

FRITZ J. BALDER.
FRANK J. LAWSON.
ALFRED C. DAVIS.

Witnesses:
H. U. HARRIS,
ANNA ANDERSON.